Patented Apr. 7, 1953

2,634,219

UNITED STATES PATENT OFFICE 2,634,219

METHOD OF FIRING GLAZE ON A CERAMIC SURFACE

Rowland D. Smith, Corning, N. Y., assignor to Corning Glass Works, Corning, N. Y., a corporation of New York No Drawing. Application January 18, 1949, Serial No. 71,559

3 Claims. (Cl. 117—125)

This invention relates to the application of decorating compositions to ceramic ware.

In the decoration of ceramic ware, such as glassware, a suspension of a finely divided vitrifiable glaze in a suitable vehicle, which may also include a pigment, is applied to the desired surface areas in any suitable manner, as by stenciling or stamping. The ware is then heated in a lehr, or by other means, to fuse the composition in place.

Relatively low-melting vitrifiable glazes containing lead oxide are frequently utilized for the application of decorations or marks to articles made of borosilicate glasses. Firing of such decorated articles in an atmosphere containing sulfur oxides, as may be the case in a direct-fired lehr, results in the production of a powdery decoration that can easily be rubbed off. At the elevated temperatures involved, the sulfur oxides react with the lead oxide to form lead sulfate, and the resulting lead sulfate tends to decompose with evolution of gases and discoloration of the decoration as well. Similar results are obtained with those compositions containing other ingredients reactive with sulfur oxides under customary firing conditions.

This difficulty can be somewhat mitigated by application of an abnormally thick coating of the decorating composition. In such case only the lead oxide at or near the surface of the coating reacts, and upon removal of the resulting powdery layer a more or less intact decoration remains. This procedure is not always desirable, however, especially in the stamping of small decorations or marks, and, moreover, tends to be wasteful.

I have now discovered that this disadvantage can be largely eliminated and that entirely satisfactory decorated ware can be produced, regardless of the presence of sulfur oxides in the firing atmosphere, by incorporating barium carbonate as a mill addition in the decorating composition. The barium carbonate reacts preferentially with the sulfur oxides under the firing conditions, thereby preventing their reaction with the other constituents of the composition. The barium sulfate formed is stable at the temperatures employed in firing, and does not adversely affect the nature or appearance of the decoration, which is not powdery and cannot be rubbed off.

In carrying out the present invention I select any suitable vitrifiable glaze, which may comprise a finely divided glass that has been prepared by melting together suitable raw materials or may comprise such raw materials themselves in powdered form, provided that they fuse at a temperature sufficiently below that at which the decoration is fired onto the ware. This vitrifiable glaze, together with powdered barium carbonate and any powdered pigment necessary to produce the desired coloring effect, is incorporated in a suitable vehicle as by milling or grinding in the conventional manner to form a smooth slip or paste. The resulting composition is then applied to glass, or the like, in the customary manner and the ware is heated, preferably in a lehr, to fire the decoration thereonto. Advantageously, where glassware is being decorated, a lehr that anneals the ware as well is utilized.

Barium carbonate is the only material which I have found satisfactory for the present purpose, and its unique utility appears to be due to the fact that not only does it preferentially react with sulfur oxides under the conditions of firing but that the barium sulfate formed does not decompose. Other barium salts, such as the chromate, the nitrate, and the fluoride, as well as other metal carbonates, are ineffective, such compounds either decomposing at temperatures below those customarily used for firing or failing to react preferentially with the sulfur oxides or forming unstable sulfates. Barium oxide may be used but is not practicable, since on standing it readily changes to the carbonate upon exposure to the atmosphere.

The amount of barium carbonate incorporated in any particular composition will depend primarily on the amount of sulfur oxides in the atmosphere to be used for firing and the length of time for which the decorated ware is exposed to such atmosphere, and sufficient should be incorporated into the composition to preferentially react with such sulfur oxides. The particular vitrifiable glaze and/or pigment included in the composition will also influence the amount of barium carbonate used, for not only may too large an amount of barium carbonate and barium sulfate interfere with satisfactory firing of the decoration, but there may also be a tendency for the color of the decoration to be diluted or altered. Amounts of barium carbonate ranging up to about 35% of the total solids can generally be employed without any undesirable effect on the final decoration, although in specific instances where other conditions permit, somewhat larger amounts may be satisfactorily utilized.

A typical ceramic decorating composition embodying my invention can be prepared by suitably milling the following ingredients in finely divided form:

|   | Grams |
|---|---|
| Lead borate | 50 |
| Basic lead carbonate | 26 |
| Chrome green | 25 |
| Barium carbonate | 10 | in the presence of:

| | |
|---|---|
| Polyethylene glycol | 30 | which serves as a vehicle for the powdered solids. This composition is especially suitable as a stamping paste for applying identification marks and decorative effects to articles made of low-expansion borosilicate glasses. Markings on ware so stamped and then heated in an oil-fired lehr to a maximum temperature of 550 to 660° C. in an atmosphere containing 0.005% of sulfur dioxide by volume, the ware passing through the lehr in half an hour and being maintained at the maximum temperature for about 5 minutes, do not rub off and are otherwise satisfactory in appearance. The lead borate and the basic lead carbonate are utilized as such, since they fuse to a glassy state during the firing of the decorating composition, and the separate preparation of a pulverized glass therefrom is avoided. The chrome green comprises the pigment and can as well be omitted or substituted by another pigment if desired.

By comparison, a stamping paste identical with the above, except for the omission of the barium carbonate, was prepared and applied to the same borosilicate ware, which was then fired under the same conditions. The fired decoration was extremely powdery and crumbly in appearance and could be easily rubbed off.

The application of my invention is not limited to the use of compositions containing lead oxide or lead salts reactive with sulfur oxides. Satisfactory protection can be provided for any composition containing an ingredient reactive with sulfur oxides, for example, alkali metal compounds and particularly sodium oxide, by incorporating barium carbonate as a mill addition therein.

Finely divided colored glasses of suitable characteristics can obviously be used in the preparation of compositions embodying the present invention and are included within the meaning of the term "vitrifiable glaze" use in the claims.

I am aware of the extensive use of barium salts including barium carbonate as fluxes in the preparation of vitrifiable enamels and glazes wherein the barium salt is melted down and fused with salts or oxides of other metals, such as lead, silicon, boron, and the alkali metals. Such use does not come within the scope of my invention, however, since, except to the extent that it reacts with the sulfur oxides in the firing atmosphere, the barium carbonate remains largely unaffected by the firing of the decorated composition.

I claim:

1. The method of firing a vitrifiable glaze onto a ceramic surface in an atmosphere containing sulfur oxides, said glaze being reactive with sulfur oxides, which includes forming a finely divided suspension of the vitrifiable glaze, incorporating therein, as a mill addition, an amount of barium carbonate sufficient to preferentially react with the sulfur oxides, applying the composition so formed to the ceramic surface, and fusing the applied composition to a dense, vitreous state.

2. The method of claim 1 in which the amount of barium carbonate incorporated in the suspension of the vitrifiable glaze is not over 35% of the total solids in said suspension.

3. The method of firing a vitrifiable glaze onto a ceramic surface in an atmosphere containing sulfur oxides, said glaze being reactive with sulfur oxides, which includes providing a finely divided suspension of the vitrifiable glaze having incorporated therein, as a mill addition, an amount of barium carbonate sufficient to preferentially react with the sulfur oxides, applying the composition thus provided to the ceramic surface, and fusing the applied composition to a dense, vitreous state.

ROWLAND D. SMITH.

REFERENCES CITED

The following references are of record in the file of this patent:

UNITED STATES PATENTS

| Number | Name | Date |
|---|---|---|
| 2,053,244 | Turk | Sept. 1, 1936 |